US012321788B2

(12) United States Patent
Ocon Cardenas et al.

(10) Patent No.: US 12,321,788 B2
(45) Date of Patent: Jun. 3, 2025

(54) SYSTEMS AND METHODS TO RESERVE RESOURCES FOR WORKLOADS

(71) Applicant: Red Hat, Inc., Raleigh, NC (US)

(72) Inventors: Sergio Fernando Ocon Cardenas, Madrid (ES); Miguel Perez Colino, Madrid (ES)

(73) Assignee: Red Hat, Inc., Raleigh, NC (US)

( * ) Notice: Subject to any disclaimer, the term of this patent is extended or adjusted under 35 U.S.C. 154(b) by 761 days.

(21) Appl. No.: 17/505,312

(22) Filed: Oct. 19, 2021

(65) Prior Publication Data

US 2023/0118846 A1 Apr. 20, 2023

(51) Int. Cl.
G06F 9/50 (2006.01)
G06F 11/34 (2006.01)

(52) U.S. Cl.
CPC .......... *G06F 9/505* (2013.01); *G06F 11/3495* (2013.01)

(58) Field of Classification Search
CPC .............................. G06F 9/505; G06F 11/3495
See application file for complete search history.

(56) References Cited

U.S. PATENT DOCUMENTS

| | | | |
|---|---|---|---|
| 8,336,054 B2 | 12/2012 | Cherkasova et al. | |
| 8,904,008 B2 | 12/2014 | Calder et al. | |
| 9,075,657 B2 | 7/2015 | Jackson | |
| 10,552,745 B2 | 3/2020 | Jacobson et al. | |
| 10,749,813 B1 | 8/2020 | Zhao et al. | |
| 2016/0210172 A1* | 7/2016 | Ramachandra | G06F 9/5072 |
| 2018/0145925 A1* | 5/2018 | Dimitrov | G06F 9/5027 |
| 2018/0321979 A1* | 11/2018 | Bahramshahry | G06F 9/4881 |
| 2021/0232429 A1* | 7/2021 | Li | G06F 9/449 |
| 2021/0248053 A1* | 8/2021 | Wei | G06F 11/3404 |
| 2022/0405134 A1* | 12/2022 | Guo | G06N 7/01 |

OTHER PUBLICATIONS

Hertz, Turbonomic Blog, "Kubernetes Rescheduling: A Pod's Life and Reincarnation", pp. 1-8 Posted by Asena Hertz, Jul. 2, 2018, Review by Richard R. Feb. 20, 2019, Powered by G2, Turbonomic, Inc., 8 Pages.
Rodriguez et al., "Containers Orchestration with Cost-Efficient Autoscaling in Cloud Computing Environments", pp. 1-22, Cloud Computing and Distributed Systems (CLOUDS) Laboratory, School of Computing and Information Systems, The University of Melbourne, Australia, 2018, Accessed on or before Oct. 19, 2021, 22 Pages https://arxiv.org/ftp/arxiv/papers/1812/1812.00300.pdf.

* cited by examiner

*Primary Examiner* — Jacob D Dascomb
(74) *Attorney, Agent, or Firm* — Kilpatrick Townsend & Stockton LLP

(57) ABSTRACT

An example system includes a node and a scheduler. The scheduler is configured to deploy a first workload for execution on the node. The scheduler is also configured to reserve a first amount of resources of the node for the first workload based on a determination that the first workload is running in a transient state. The scheduler is also configured to reduce the first amount of the resources of the node reserved for the first workload based on a determination that the first workload is running in a non-transient state.

16 Claims, 5 Drawing Sheets

PRIOR TO NEW WL DEPLOYMENT

NEW WL RUNNING IN TRANSIENT STATE
(e.g., Initialization Stage )

NEW WL RUNNING IN NON-TRANSIENT STATE

SYSTEMS AND METHODS TO RESERVE RESOURCES FOR WORKLOADS

BACKGROUND

The present disclosure relates generally to resource allocation for workloads. Computer systems may run workloads (e.g., applications or services) that are provided via a server or cloud. The workloads may be developed and deployed as a single unit or as multiple units, such as a collection of microservices. Additionally, the workloads may run within a pod as a group of containers, which may be run on physical or virtual machines. For example, containers may encapsulate a lightweight runtime environment for an application or a microservice. Containers and their associated application instances may be replicated on node clusters in order to scale applications to meet workload demands. Each workload or pod (e.g., tenant) may co-exist with other tenants on a same node. Specifically, a cloud infrastructure may represent a multi-tenant processing infrastructure where resources are shared to increase system-wide performance thereby providing enhanced results to clients of the processing infrastructure.

SUMMARY

The present disclosure provides new and innovative systems and methods for scheduling workloads, especially in a cloud environment. In an example, a system includes a node and a scheduler. The scheduler is configured to deploy a first workload for execution on the node. The scheduler is also configured to reserve a first amount of resources of the node for the first workload based on a determination that the first workload is running in a transient state. The scheduler is also configured to reduce the first amount of the resources of the node reserved for the first workload based on a determination that the first workload is running in a non-transient state.

In an example, a method includes deploying a first workload for execution on a node. The method also includes reserving a first amount of resources of the node for the first workload based on a determination that the first workload is in a transient state. The method also includes reducing the first amount of the resources reserved for the first workload based on a determination that the first workload is in a non-transient state.

In an example, a non-transitory machine-readable medium stores code which, when executed by a computer system, causes the computer system to deploy a first workload for execution on a node. The non-transitory machine-readable medium also causes the computer system to reserve a first amount of resources of the node for the first workload based on a determination that the first workload is in a transient state. Additionally, the non-transitory machine-readable medium causes the computer system to reduce the first amount of the resources reserved for the first workload based on a determination that the first workload is in a non-transient state.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
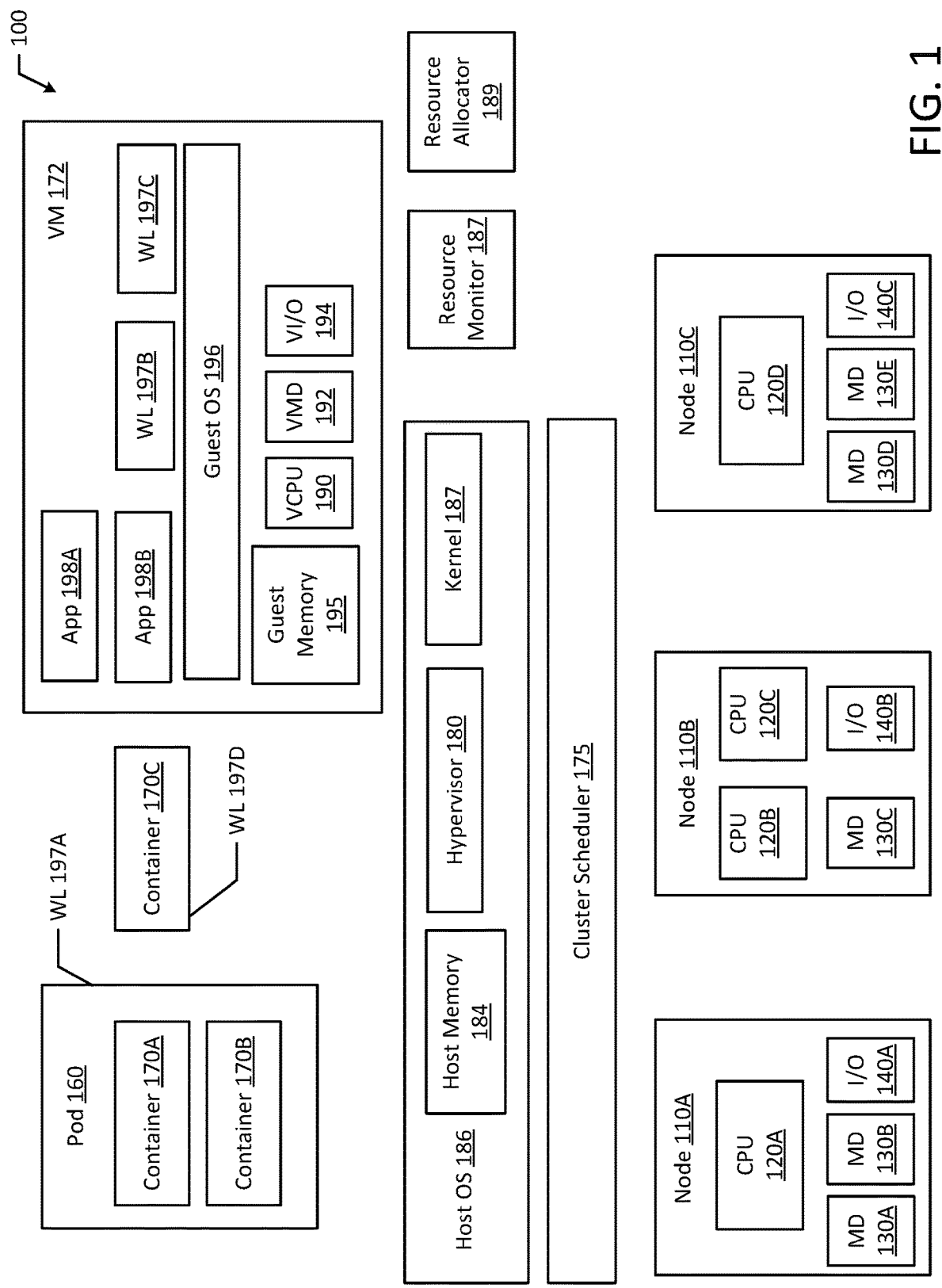
FIG. 1 illustrates a block diagram of an example computing system according to an example embodiment of the present disclosure.

Techniques are disclosed for dynamic resource reservation for scheduling real-time workloads, especially in a cloud environment. For example, workloads need a minimum amount of resources (e.g., processor(s), memory, data storage, network bandwidth, etc.) to run, but can benefit from additional resources if they are available. In a shared resource environment, such as a cloud environment, limited resource availability may result in limitations as to the types and characteristics of workloads running concurrently on a shared platform (e.g., node, server, etc.) and/or inefficiencies in the use of these resources. For example, if insufficient resources are available on the node at which a workload is running, the workload may experience latency, failure, or other types of performance issues. On the other hand, if an excessive amount of resources are reserved for a workload, then other workloads may not be able to use these resources even if the workload is not currently using them.

In order to maximize and/or optimize usage of resources, operating systems and/or cloud environments may use a scheduler for deploying new workloads on physical machines (e.g., nodes) or virtual machines that are expected to have enough resources for a scheduled workload, so that the scheduled workload can run successfully. For example, in a cloud environment, when a new workload is created or dispatched, the scheduler is responsible for selecting a physical (e.g., Node) or virtual machine for deploying the workload, based on a set of rules or functions that evaluate resource availability on the node and the resource requirements of the workload. If no suitable node is identified, then the workload may remain unscheduled until the scheduler identifies a suitable node. More specifically, the scheduler may filter suitable nodes (or virtual machines) based on the requirements of the workload and the other workloads currently running on the nodes. In some examples, a user or administrator of a workload may specify how much of each resource is requested for the workload (e.g., CPU resources, memory resources, network resources, etc.). The requested resources can be expressed as a specific limit or maximum amount of each resource that be available for allocation to the workload while it is running.

When assigning workloads to a node, a scheduler may ensure that a sum of all the maximum amounts of resources (requested or assigned) for all deployed workloads on a node is less than a total amount of resources of the node. For example, if an unreserved amount of resources is insufficient to deploy a new workload to a node, then the scheduler may look for a different node to deploy the new workload or may delay deploying the new workload altogether until one or more nodes having sufficient unreserved resources become available. However, an actual amount of resources used by a given workload running on the node may vary over time. As an example, the actual resource usage by the given workload during initialization (e.g., when an application is starting) or other transient period may be much higher than its usage after initialization (or during other non-transient periods). More generally, actual resource usage of a particular resource (e.g., memory) by the given workload at a given time may be as low as zero or as high as the resource limit of the workload. Some scheduler policies may even allow a workload to use more than its assigned resource limit subject to current availability of such excess resources on the node. In any case, by reserving the sum of (requested or assigned) resource limits of all workloads deployed on a node, the scheduler may guarantee availability of the maximum resource limit for any deployed workload even if all the deployed workloads request their maximum resource limits at the same time.

However, if a scheduler or user reserves a high amount of resources to guarantee resource availability for a workload during transient periods (e.g., initialization, peak periods, etc.), then an unused portion of these reserved resources will remain unavailable for allocation to other workloads even if the workload only needs a small portion of the reserved resources for long periods of time. As a result, new workloads may remain unscheduled even if sufficient unused (but reserved) node resources are currently available.

On the other hand, if the user or the scheduler does not reserve a sufficient amount of resources for the workload to accommodate requirements during peak or transient periods, then the scheduler might successfully find a node to deploy the workload sooner. However, the deployed workload may fail at a later time if there are insufficient resources on the node to allocate to the workload during its transient or peak periods. When a workload fails, in some configurations, a scheduler may attempt to restart the workload (or redeploy another instance of the workload) on the same node or a different node, which may potentially fail as well if resources are insufficient during its transient period. Whether or not the scheduler restarts the failed workload, frequent workload failures may still impact an overall performance and/or latency of the computing system because resources used during a failed workload deployment could have instead been used by other successful workload deployments.

The systems and methods disclosed herein enable dynamic reservation of different amounts of resources for a workload at different time periods while the workload is running. As an example, when a first workload is discovered or dispatched or created in an example computing system, an example scheduler selects a node (or virtual machine) for deployment of the first workload. While the first workload is running on the node, the scheduler (or other component of the system) determines whether the first workload currently has a first state (e.g., transient state, initialization state, peak resource usage state, etc.) or a second state (e.g., non-transient state, normal state of operation, low resource usage state, idle state, etc.). If the first workload is deemed to be in the first state, then the example scheduler (or other system component) reserves a first amount of resources on the node. If the first workload is deemed to be in the second state, then the scheduler or other system component reserves a smaller amount of the resources on the node (or reduces the first amount of the resources previously reserved) for the first workload.

When a second workload is subsequently discovered or dispatched or created in the example system, then the scheduler determines whether the node currently has sufficient unreserved resources to deploy the second workload on the node. Thus, if the first workload was currently running in the first state (e.g., transient state), then the scheduler may determine that a smaller amount of unreserved resources is currently available on the node than if the first workload was instead currently running in the second state (e.g., non-transient state). The example scheduler or computing system could thus advantageously free some of the resources on the node for allocation to other workloads during periods when the first workload is deemed to be running in the second or non-transient state. In other words, when the scheduler tries to find a suitable node to run the second workload, the scheduler may reserve different resource amounts for the first workload depending on its current state (e.g., transient or non-transient).

In an example, the scheduler may determine that the first workload is in the first state (e.g., transient state) as a default state when the first workload first starts running on the node. In this example, the scheduler may thus reserve the first amount of resources (i.e., higher amount) during initialization of the first workload (e.g., to accommodate high resource usage expected during workload initialization). After passage of a threshold period of time from a start of the deployment of the first workload on the node, the scheduler may then reduce the previously reserved first amount of the resources (e.g., to accommodate low resource usage after initialization). For instance, the scheduler may determine that the first workload has likely transitioned from a transient state (e.g., initialization) to a non-transient state (e.g., post initialization) automatically after passage of the threshold period.

Alternatively or additionally, the scheduler or system may be configured to determine that the first workload transitioned from the transient state when resource usage by the first workload passes a threshold usage. For example, after initialization is complete, the first workload may be expected to use fewer processor or memory resources. Thus, when the scheduler or system detects that current usage by the first workload has decreased below the threshold usage, the scheduler may responsively determine that the first workload has transitioned to the non-transient state and thus reserve a smaller amount of resources on the node. Similarly, the scheduler can use the same or different threshold usage value to trigger a determination that the first workload has transitioned from a non-transient state (at which a smaller amount of resources should be reserved) to a transient state (in which a higher amount of resources should be reserved).

The scheduler may obtain the various resource reservation parameters described above (e.g., amount of resources to reserve in transient state, amount of resources to reserve in non-transient state, threshold period of time to automatically transition from transient reservation to non-transient reservation, threshold resource usage values, etc.) from a user or administrator of a workload. For example, the system may allow the user to supply values for the transient resource reservation amount, the non-transient resource reservation amount, the threshold period of time for initialization, and/or the threshold resource usage levels to determine transition of the state of the workload.

Alternatively or additionally, the scheduler or system can assign default values as one or more of these resource reservation parameters for a workload (e.g., if no user-supplied values were provided). In an example, the system may assign a set of default values for a cluster of nodes (e.g., for any workload deployed in the cluster that do not have its own user-supplied values).

Alternatively or additionally, the scheduler or system can monitor resource usage by one or more instances of a particular workload (currently or previously) deployed on the computing system, and determine the values of the one or more of the resource reservation parameters to enforce for the particular workload accordingly. As an example, the system can determine that previous instances of an application deployed on this or other nodes needed about five minutes to complete initialization and thus set the threshold period to five minutes. In some examples, the computing system or scheduler can use machine learning or other artificial intelligence algorithms to predict suitable values or thresholds to use when a new instance of the particular workload is deployed.

Referring now to the Figures, FIG. 1 depicts a high-level component diagram of an example computing system 100 in accordance with one or more aspects of the present disclosure. The computing system 100 may include an operating system (e.g., host OS 186), one or more workloads (e.g., WL 197A-D), and nodes (e.g., nodes 110A-C). The nodes 110A-C may be cluster nodes.

As used herein, a workload (e.g., WL 197A-D) may be an application (e.g., WL 197B-C may be similar to Apps 198A-B), a container (e.g., WL 197D is a container 170C), a pod of containers (e.g., WL 197A is a pod 160 that includes containers 170A-B), a service, a microservice, or a virtual machine (e.g., VM 172). The workloads 197A-D (e.g., programs, applications, services, microservices, containers, pods) may be added to the computing system 100 to provide additional application functionality or to scale certain services or aspects of an application. For example, as processes are scaled to meet increased demand from clients, workloads 197A-D (e.g., containers or pods) may be replicated and deployed on various nodes and/or node clusters to handle the increased load.

The computing system 100 may also include a cluster scheduler 175 that initializes, schedules, or implements workloads 197A-C on various nodes 110A-C. The cluster scheduler 175, which may be referred to generally as scheduler 175, may schedule workloads 197 (e.g., pods, containers, applications) based on resource availability in the system 100, current resource usage by a workload 197, resource availability on the nodes 100A-C, scheduling policies or load balancing parameters of each workload 197 and/or node 110, and/or current deployment states (e.g., transient, non-transient, etc.) of each workload 197. In an example, the scheduler 175 may be a monolithic scheduler that handles all scheduling requests or a shared-state scheduler. A shared-state scheduler may have multiple scheduling components with full access to the entire cluster of resources. In an example, scheduler 175 may be a cluster scheduler that uses placement constraints and schedules applications or workloads. Additionally, scheduler 175 may schedule workloads 197 rapidly to avoid workloads 197 from sitting in a pending or unscheduled state. Resource usage and/or availability information (e.g., resource reservations for each WL) of a cluster node (e.g., node 110A-C) may be exposed to the cluster scheduler 175.

In some examples, the load balancing parameters may be based on tenant per host density thresholds. For example, the load balancing parameters may be set to increase the tenant per host density or pod per host density, thereby conserving system resources. By maximizing the tenant per host density or workload 197 (e.g., pod 160) per host density, less hosts may be used and system resources are conserved. Load balancing parameters may be based on a threshold level of available resources on a cluster node (e.g., node 110A-C), a threshold quantity of WL(s) 197 on a cluster node, the type of WL(s) on a cluster node, etc. As previously mentioned, resource usage and WL deployment state information (e.g., current amounts of resources reserved/used by WLs, transient or nontransient states of each workload, etc.) of a cluster node (e.g., node 110A-C) may be exposed to the cluster scheduler 175 for scheduling purposes. Each of the above considerations may be and optimizations may be monitored and adjusted in the event one or more of the WL(s) becomes a noisy neighbor, or when a WL transitions between a first state (e.g., transient state) that requires reserving a higher amount of resources on the node and a second state (e.g., non-transient state that requires reserving a smaller amount of resources on the node.

In the illustrated example, pod(s) 160 may each include one or more containers 170A-B. As discussed above, pod 160 may be a workload 197 (e.g., WL 197A). For example, containers 170A-B may be treated as a single unit of deployment in pod 160. In an example, containers 170A-B may be organized in pod 160 and may be co-located on the same node (e.g., node 110A) and share the same resources. For example, pod 160 and associated containers 170A-B may be located on node 110A and share the same resources, network, memory, and storage of the node 110A (e.g., CPU 120A, memory devices 130A-B, and input/output device(s) 140A). Alternatively or additionally, pod 160 may be located on a node cluster or group of nodes (e.g., nodes 110B-C). Each pod 160 may have a dedicated IP address that is shared by all the containers belonging to a respective pod 160. Additionally, a pod 160 and/or containers 170A-B scheduled to a node cluster may share the resources of the node cluster (e.g., CPU 120B-D, memory devices 130C-D, and input/output device(s) 140B-C). In an example, multiple pods 160 may be located on the same node (e.g., node 110B). In another example, each pod 160 may be located on its own node 110A-C. Similarly, containers 170A-B may run on the same node (e.g., node 110A) or on different nodes 110, for example, each container 170 may be located on its own node 110.

Containers 170A-D may execute applications, services or microservices. As discussed above, a container 170 may be a workload 197 (e.g., container 170C may be considered a WL 197D). In an example, the containers 170A-D may each run a process or service and the containers 170A-D may be any execution environment. For example, one or more of the containers 170A-D may be a server, such as a virtual server. It should be appreciated that one or more of the containers 170A-D may be stand-alone execution environments, similar to that of a virtual machine.

Virtual machine ("VM") 172 may include guest OS(s), guest memory or virtual machine memory, a virtual CPU (VCPU), virtual memory devices (VMD), and virtual input/output devices (VI/O). For example, VM 172 may include guest OS 196, guest memory or virtual machine memory 195, a virtual CPU(s) 190, a virtual memory device(s) 192, and a virtual input/output device(s) 194. Virtual machine memory or guest memory 195 may include one or more memory pages. In an example, VM 172 may execute the guest OS 196 and run applications 198A-B or WLs 197B-C, which may utilize the underlying VCPU 190, VMD 192, and VI/O device 194. Although the illustrated example shows a single VM 172, in some examples, the system 100 alternatively includes one or more additional virtual machines similar to VM 172.

The computer system 100 may include a hypervisor 180 and host memory 184. Hypervisor 180 may manage host memory 184 for the host operating system 196 as well as memory allocated to the virtual machine 172 and/or guest operating system 196, such as guest memory or virtual machine memory 195 provided to guest OS 196. In an example, host memory 184 and virtual machine memory 195 may be divided into a plurality of memory pages that are managed by the hypervisor 180. Virtual machine memory 195 allocated to the guest OS 196 may be mapped from host memory 184 such that when a guest application 198A-B and/or a WL 197B-C uses or accesses a memory page of virtual machine memory 195, the guest application 198A-B and/or the WL 197B-C is actually using or accessing host memory 184.

The computing system 100 may include a resource monitor 187. The resource monitor 187 may be configured to monitor resource utilization in the system 100 or in a node 110, and/or resource utilization by each of the workloads 197 (e.g., pods 160, containers 170, VM 172, applications, individual threads, etc.). The host OS 186, kernel 185, or cluster scheduler 175 may obtain information from the resource monitor 187 for advanced resource-aware and/or workload-state aware scheduling decisions. The resources monitored by the resource monitor 187 may include processing resources (e.g., CPUs 120, etc.), memory resources (e.g., MD 130, etc.), bandwidth resources (e.g., network bandwidth, bandwidth between available between a CPU 120 and an I/O device 140, etc.), and/or other types of computing resources (e.g., storage space on a disk or other type of data storage device, etc.).

Additionally, the computing system 100 may include a resource allocator 189 (or a resource reservation module 189). The resource allocator 189 may be configured to redistribute or reallocate node resources between workloads 197 (e.g., pods 160, containers 170, VMs 172, applications, individual threads, etc.). For example, cache or memory resources may be redistributed or reallocated between the workloads 197. The resource allocator or reservation module 189 may be configured to reserve different amounts of resources on a node 110 for a particular WL 197 running on the node at different times. As an example, the resource allocator 189 may reserve a first amount of resources on node 110C for WL 197D when the WL 197D first starts running on the node 110C, and then reduce the first amount of the resources of node 110C reserved for the WL 197D after passage of a threshold period of time from the start of the deployment of the WL 197D on the node 110C.

One or more of the features of the resource monitor 187 and/or the resource allocator 189 described above may instead be performed by the host OS 186, the kernel 185, the hypervisor 180, and/or the cluster scheduler 175.

The computer system 100 may include one or more nodes 110A-C. The nodes 110A-C may be cluster nodes with one or more machines running in a cluster. Each node 110A-C may in turn include one or more physical processors (e.g., CPU 120A-E) communicatively coupled to memory devices (e.g., MD 130A-E) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Workloads 197 may be provisioned on the same host or node (e.g., node 110A) or different nodes. For example, WL 197A and WL 197B may both be provisioned on node 110A. Alternatively, WL 197A may be provided on node 110A while WL 197B is provisioned on node 110B. Nodes 110A-C may be non-uniform memory access ("NUMA") nodes.

As used herein, a processor may also be referred to as a central processing unit (CPU). Additionally, as used herein, physical processor or processor (e.g., CPU 120A-D) refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

As discussed herein, a memory device 130A-E refers to a volatile or non-volatile memory device, such as RAM, ROM, EEPROM, disk, or any other device capable of storing data. As discussed herein, I/O device 140A-C refers to a device capable of providing an interface between one or more processor pins and an external device capable of inputting and/or outputting binary data.

Processors 120A-D may be interconnected using a variety of techniques, ranging from a point-to-point processor interconnect, to a system area network, such as an Ethernet-based network. Local connections within each node, including the connections between a processor 120A-D and a memory device 130A-E may be provided by one or more local buses of suitable architecture, for example, peripheral component interconnect (PCI).

Figure 2:
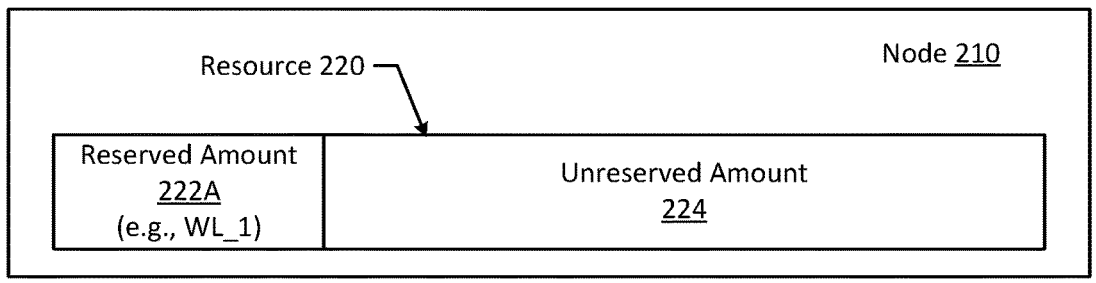
FIG. 2 illustrates a node resource reservation scheme according to an example embodiment of the present disclosure.
Figure 2:
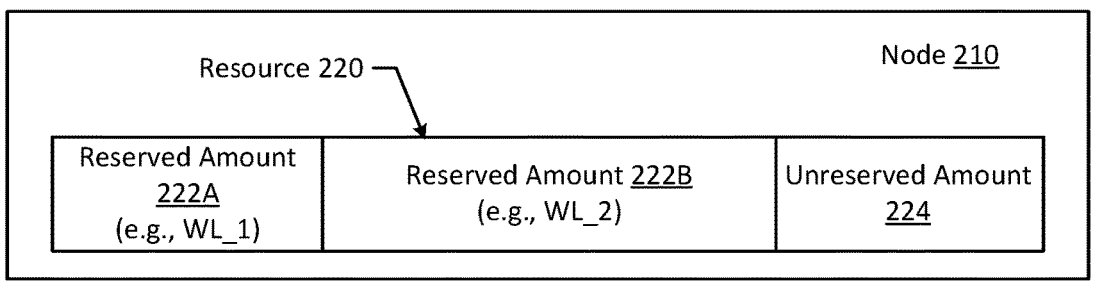
Figure 2:
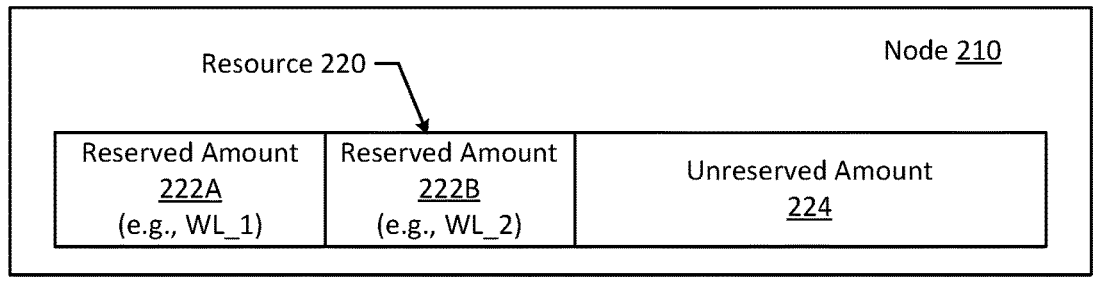

FIG. 2 illustrates a block diagram of example resource reservation and workload scheduling schemes, according to an example embodiment. Each allocation scheme 200A-C illustrates reserved amounts (e.g., 222A-B) and unreserved amounts (e.g., 224) of a resource 220 included in or available to a node 210. The node 210 (e.g., cluster node) may be similar to any of the nodes 110 of system 100.

The resource 220 may represent any type of computing resource. In an example, the resource 220 may include a memory resource such as RAM, cache, or any other type of memory capacity (e.g., host memory 184, guest memory 195, a MD 130, etc.) available on the node 210 for allocation to one or more workloads. In an example, the resource 220 may include a processing resource such as physical or virtual CPUs (e.g., CPU(s) 120), processor cores, processor threads, hardware threads, or any other type of processing capacity available for allocation to one or more workloads running on the node 210. In an example, the resource 220 may include a bandwidth resource such as network bandwidth, I/O bus bandwidth, or any other type of bandwidth capacity available for allocation to one or more workloads running on the node 210.

As illustrated in reservation scheme 200A (e.g., prior to deployment of a new WL), a portion or amount 222A of the resource 220 is reserved for one or more workloads (e.g., "WL_1") that is currently running on the node 210. It is noted that an actual amount of resources being used by WL_1 may be different than the reserved amount 222A. In an example, WL_1 or a scheduler (e.g., scheduler 175) that assigned WL_1 to the node 210 may have a scheduling policy that allows an OS (e.g., OS 186) to allocate no more than the reserved amount 222A to WL_1 while WL_1 is running on the node 210. Alternatively, in an example, the scheduling policy may allow WL_1 to use more than the reserved amount 222A subject to availability of the excess requested amount on the node (e.g., in the unreserved amount 224). However, for the purposes of evaluating the suitability of node 210 for deployment of a new WL (e.g., "WL_2"), the scheduler (e.g., 175) may evaluate whether the currently unreserved amount 224 of the resource 220 is sufficient for a requested or maximum amount of resources associated with the new WL_2.

As illustrated in reservation scheme 200B, the unreserved amount 224 of the resource 220 may be deemed (e.g., by the scheduler 175) to be sufficient for running the new WL_2 even in a transient state (e.g., during initialization, etc.) of WL_2. In turn, as illustrated in reservation scheme 200B, WL_2 is deployed on the node 210 and a transient amount 222B of the resource 220 is reserved for WL_2. For example, the reserved amount 222B may be a relatively large amount of the resource 220 that is sufficient to accommodate high resource usage associated with initializing WL_2 (e.g., installing a new application, starting up a virtual machine, etc.) when the WL_2 starts running on the node 210. For example, during the transient period or initialization period of the WL_2, if the scheduler (e.g., scheduler 175) evaluates the suitability of the node 210 for deploying another new workload (not shown), the current unreserved amount 224 shown in the reservation scheme 200B may be deemed insufficient for deployment of that additional new workload.

As illustrated in reservation scheme 200C, the reserved amount 222B of resource 220 for WL_2 is reduced after WL_2 is determined to be running in a non-transient state, thereby increasing the unreserved amount 224. For example, after the WL_2 completes its initialization stage (e.g., starting up a new virtual machine, etc.), WL_2 may be expected to run in the non-transient state at which WL_2 consumes fewer resources. As such, a portion of the reserved amount 222B may be reduced to allow the scheduler (e.g., scheduler 175) to assign more workloads to the node 210.

Figure 3:
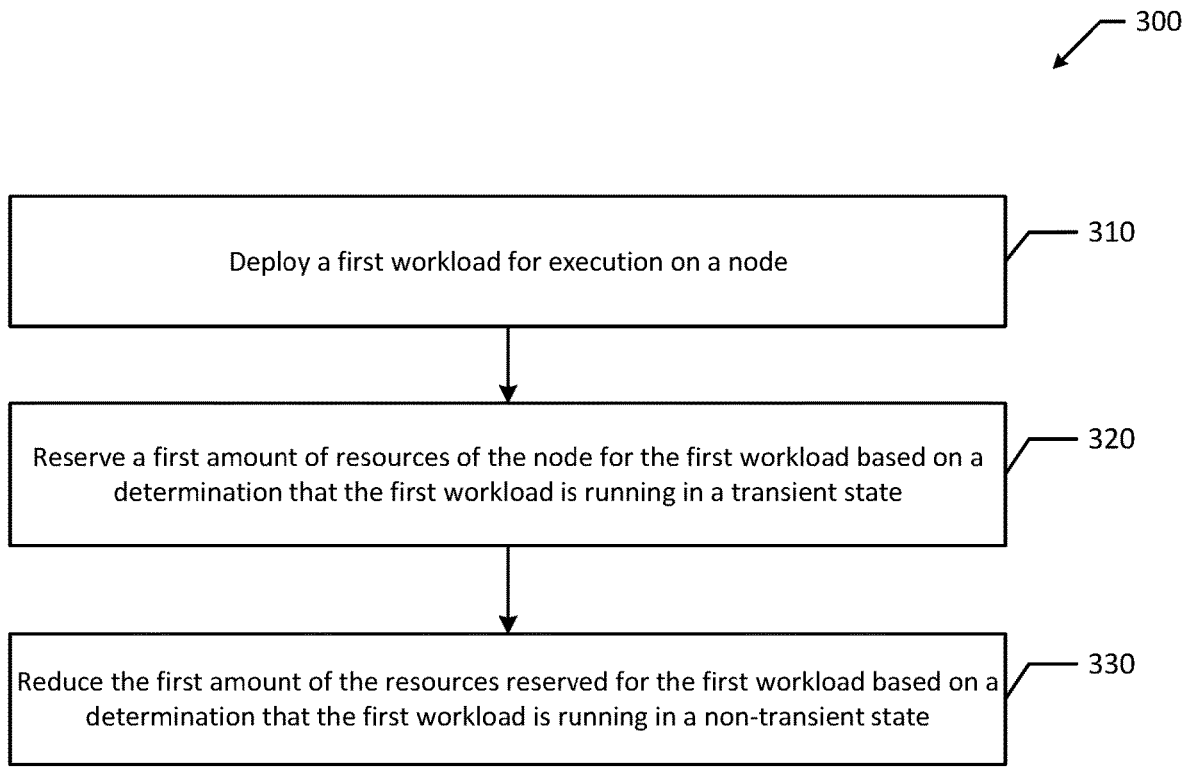
FIG. 3 illustrates a flowchart of an example process for scheduling workloads according to an example embodiment of the present disclosure.

FIG. 3 illustrates a flowchart of an example method 300 for reserving node resources for real-time workloads according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, one or more blocks may be repeated, and some of the blocks described are optional. The method 300 may be performed by processing logic that may comprise hardware (circuitry, dedicated logic, etc.), software, or a combination of both.

At block 310, the method 300 includes deploying a first workload for execution on a node. Referring back to FIG. 1 for example, the scheduler 175 may select node 110A for running the WL 197A.

At block 320, the method 300 includes reserving a first amount of resources of the node for the first workload based on a determination that the first workload is running in a transient state. Referring back to FIG. 2 for example, the scheduler (e.g., scheduler 175) may reserve the first amount 222B of resource 220 shown in scheme 200B for WL_2 that is relatively high to accommodate initialization resource requirements of WL_2 during the transient state.

At block 330, the method 300 includes reducing the first amount of the resources reserved for the first workload based on a determination that the first workload is running in a non-transient state. Continuing with the example above, the scheduler may reduce the first amount 222B reserved for WL_2 from the higher amount shown in scheme 200B to the lower amount illustrated in scheme 200C based on a determination (e.g., passage of a threshold period of time, etc.) that WL_2 is in the non-transient state.

In some examples, the method 300 includes determining that the first workload is running in the transient state based on passage of less than a threshold initialization period from a start of the deployment of the first workload on the node. Additionally or alternatively, the method 300 may also include determining that the first workload is running in the non-transient state based on passage of the threshold initialization period from the start of the deployment of the first workload on the node. For example, the scheduler 175 or the OS 186 can automatically determine that WL 197A is in a transient state during the threshold initialization period (e.g., 5000 milliseconds, etc.) from a start of the deployment of WL 197A on a given node 110. After that threshold initialization period passes, the scheduler 175 or the OS 186 may then automatically assume that the WL 197A is no longer running in the non-transient state and thus a smaller amount of the resources of the given node can be reserved for the purposes of determining the suitability of the given node for deployment of another workload. The threshold initialization period may be a user-supplied period (e.g., stored in metadata or other configuration data supplied by an administrator of the first workload). Alternatively, a default threshold initialization period can assigned to the first workload (e.g., by the scheduler 175, etc.). For example, if no user-supplied value for the threshold initialization period is available, the system 100 can assign a default value as the threshold initialization period of the first workload.

In some examples, method 300 includes determining that the first workload is running in the non-transient state in response to resource usage by the first workload being less than a threshold usage. For example, the OS 186 or resource monitor 187 or the scheduler 175 may monitor resource usage by the first workload while it is running on the node and automatically trigger a determination that it is no longer in the non-transient state when the monitored resource usage decreases and remains below the threshold usage amount. In this case, the system 100 may determine that the first workload has likely transitioned to the non-transient state and thus a smaller amount of resources can be reserved for the purposes of evaluating the suitability of the node for deployment of additional workloads. Similarly, in some examples, method 300 includes determining that the first workload is running in the transient state in response to the resource usage by the first workload exceeding the threshold usage (or a second different threshold usage). For example, if the resource usage by the first workload begins to exceed a certain level, then the system 100 may determine that the first workload has entered a peak period or other transient state at which a larger number of resources should be reserved to avoid potential failures. The threshold usage values may be user-supplied (e.g., stored in metadata associated with the first workload), default values e.g., when a user-supplied value is not available, or may be determined by monitoring resource usage by the first workload in one or more instances of the first workload that are currently or previously deployed in the system 100.

In some examples, reducing the first amount of the resources at block 330 includes setting the first amount of the resources according to a user-supplied amount indicated in metadata associated with the first workload. Referring back to FIG. 1 example, an administrator or user of WL 197A may specify a first amount of resources (e.g., four processor threads or cores or CPUs) as the maximum amount of processing resources to be available for allocation to the WL 197A in the transient state, and a smaller maximum amount (e.g., two processor threads or cores or CPUs) be available for allocation to the WL 197A in the non-transient state. The computer system 100 may save these settings for the WL 197A in metadata or other configuration data associated with the WL_197A. In turn, when the scheduler 175 is evaluating whether the node 110A is suitable for deployment of another workload (e.g., WL 197B), then the scheduler will use the higher first amount as the reserved amount if the WL_197A is determined to be currently running in the transient state or use the smaller reduced first amount if the WL_197A is determined to be currently running in the non-transient state.

In some examples, method 300 includes monitoring resource usage by one or more instances of the first workload deployed in the system. In an example, method 300 includes determining, based on the monitored resource usage, the reduced first amount of the resources at block 330. For example, the system 100 may be configured to deploy multiple instances of the first workload (e.g., copies of WL_197A) on the same node 110A or on different nodes. Thus, in this example, the system 100 can monitor (or use machine learning to predict) how much of each node resource that the multiple deployed instances of the first workload are using during transient periods (e.g., during initialization) and how much of those same resources that the deployed instances are using when they transition into non-transient states. In this way, for example, the system 100 can determine an optimum reduced amount of resources to reserve for future instances of a same workload that are deployed.

Similarly, in some examples, method 300 includes determining the threshold initialization period and/or other threshold usage values (for determining whether the first workload is in the transient or non-transient state) based on the monitored resource usage by the one or more instances of the first workload (e.g., deployed in the system 100).

Figure 4:
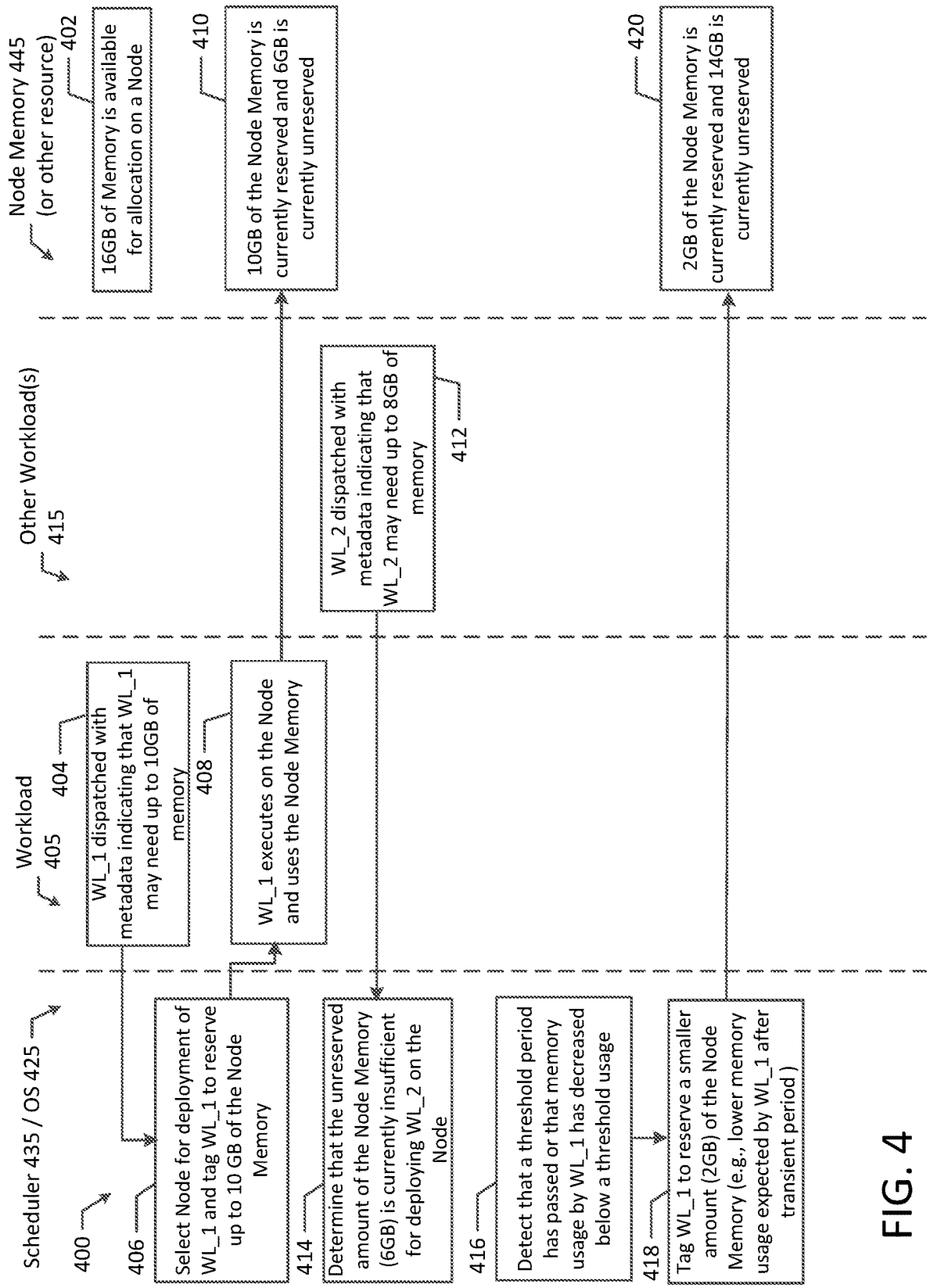
FIG. 4 illustrate a flow diagram of an example process for dynamic scheduling of workloads according to an example embodiment of the present disclosure.

FIG. 4 illustrates a diagram of an example method 400 for dynamically reserving node resources for scheduling workloads in accordance with an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, one or more blocks may be repeated, and some of the blocks described are optional. For example, a scheduler 435 (e.g., scheduler 175) or an operating system (OS) 425 (e.g., host OS 186) may communicate with a real-time workload 405 and/or other workloads 415 to perform example method 400 and to dynamically reserve node memory 445 (or other resource of a node on workload 405 ("WL_1") is running).

In the illustrated example, at block 402, 16 gigabytes (GB) of a memory resource is available for allocation on a node (e.g., one of the nodes 110). At block 404, WL_1 (WL 405) is dispatched with metadata indicating that WL_1 may need up to 10 GB of memory. In an example, the metadata may include two different memory limits for WL_1 such as the 10 GB limit for a transient state of operation of WL_1 and a different smaller amount of memory limit (e.g., 2 GB) for a non-transient state of operation of WL_1.

At block 406, the scheduler 435 or the OS 425 selects a Node (e.g., one of the nodes 110) for deployment of WL_1 (e.g., the node that includes the node memory 445). The scheduler 435 or the OS 425 may also tag WL_1 (e.g., via the metadata or other configuration data) to indicate that up to 10 GB of the Node Memory 445 should be reserved while WL_1 is running in the transient state.

At block 408, WL_1 (i.e., WL 405) executes on the Node selected by the scheduler 435/OS 425 at block 406, and uses the Node Memory 545. In turn, at block 410, 10 GB of the Node Memory 445 is currently reserved and 6 GB is currently unreserved.

At block 412, a second workload ("WL_2") of WLs 415 is dispatched to the scheduler 435 with instructions and/or metadata indicating that WL_2 may need up to 8 GB of memory. At block 414, the scheduler 435 determines that the current unreserved amount of the Node Memory 445 (6 GB) is insufficient for deploying WL_2 on the same node on which WL_1 is running. In an example, the scheduler 435 may responsively select a different Node for deploying WL_2 or may keep WL_2 unscheduled until a suitable node (i.e., having at least 8 GB of unreserved memory) becomes available.

At block 416, the scheduler 435 or the OS 425 detects that a threshold period of time has passed since WL_1 started running, or that memory usage by WL_1 has decreased below a threshold usage. When one of these thresholds is triggered, the scheduler or OS may determine that WL_1 has transitioned from a transient state to a non-transient state, for instance, after passage of an initialization stage of WL_1. In turn, at block 418, the scheduler 435 or the OS 425 may tag WL_1 to reserve a smaller amount (e.g., 2 GB) of the Node memory 445 instead of the initial higher amount (e.g., 10 GB), thereby freeing a larger amount of the node memory 445 as unreserved memory for the purposes of scheduling future workloads. For example, at block 420, the current reserved amount of node memory 445 becomes 2 GB (instead of 10 GB) and the current unreserved amount of node memory 445 becomes 14 GB (instead of 6 GB). Thus, after block 420, if the scheduler 435 evaluates the suitability of the Node on which WL_1 is running for deployment of an additional workload (e.g., WL_2), the Node may now be deemed suitable because of the larger amount of unreserved Node memory 445.

Figure 5:
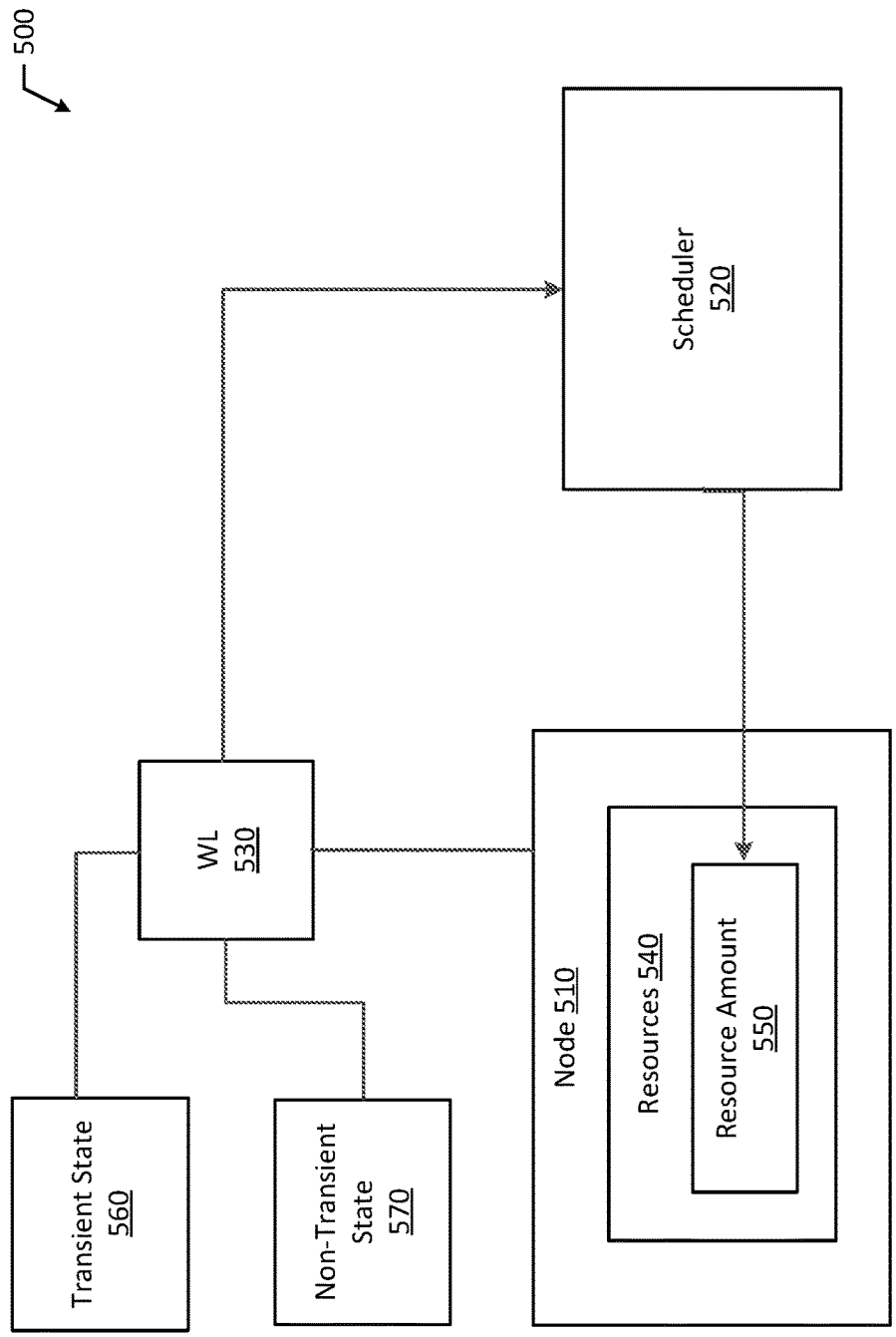
FIG. 5 illustrates a block diagram of an example workload scheduling system according to an example embodiment of the present disclosure.

FIG. 5 is a block diagram of an example system 500 for scheduling workloads, according to an example embodiment of the present disclosure. The system 500 includes a node 510 and a scheduler 520. The scheduler 520 is configured to deploy a first workload 530 for execution on the node 510. The scheduler 520 may also be configured to reserve a first amount 550 of resources 540 of the node 510 for the first workload 530 based on a determination that the first workload 530 is running in a transient state 560. The scheduler 520 may also be configured to reduce the first amount 550 of the resources 540 of the node 510 reserved for the first workload 530 based on a determination that the first workload 530 is running in a non-transient state 570.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system comprising:
   a processing device; and
   a memory device including instructions that are executable by the processing device for causing the processing device to:
   deploy, by a scheduler, a first workload for execution on a node;
   determine, by the scheduler, that the first workload is running in a transient state in response to determining that resource usage by the first workload exceeds a threshold usage;
   reserve, by the scheduler, a first amount of resources of the node for the first workload based on the determination that the first workload is running in the transient state;
   determine, by the scheduler, that the first workload is running in a non-transient state in response to determining that the resource usage by the first workload is less than the threshold usage;
   reduce, by the scheduler, the first amount of the resources of the node reserved for the first workload based on the determination that the first workload is running in the non-transient state;
   determine, by the scheduler, whether an unreserved amount of the resources of the node is sufficient for deployment of a second workload on the node, wherein reducing the first amount of the resources reserved for the first workload increases the unreserved amount of the resources;
   based on the unreserved amount of the resources being sufficient for the deployment of the second workload, dispatch, by the scheduler, the second workload to be deployed on the node; and
   reserve, by the scheduler, a second amount of the resources of the node for the second workload based on the second workload being deployed on the node.

2. The system of claim 1, wherein reducing the first amount of the resources includes setting the first amount of the resources according to a user-supplied amount indicated in metadata associated with the first workload.

3. The system of claim 1, wherein the scheduler is further configured to:
   monitor resource usage by one or more instances of the first workload deployed in the system, wherein the deployment of the first workload on the node is a deployment of an instance of the first workload in the system; and
   based on the monitored resource usage, determine the reduced first amount of the resources to reserve for the first workload when the first workload is running in the non-transient state.

4. The system of claim 1, wherein the scheduler is further configured to:
   determine that the first workload is running in the transient state based on passage of less than a threshold initialization period from a start of the deployment of the first workload on the node; and
   determine that the first workload is running in the non-transient state based on passage of the threshold initialization period from the start of the deployment of the first workload on the node.

5. The system of claim 4, wherein the threshold initialization period is a user-supplied value indicated in metadata associated with the first workload.

6. The system of claim 4, wherein the scheduler is further configured to:
   determine that metadata associated with the first workload does not include a user-supplied value for the threshold initialization period; and
   responsively assign a default value as the threshold initialization period for the first workload.

7. The system of claim 4, wherein the scheduler is further configured to:
   monitor resource usage by one or more instances of the first workload deployed in the system, wherein the deployment of the first workload on the node is a deployment of an instance of the first workload in the system; and
   determine the threshold initialization period for the first workload based on the monitored resource usage.

8. The system of claim 1, wherein the threshold usage is a first threshold usage, and wherein the scheduler is further configured to:
   determine that the first workload is running in the transient state in response to the resource usage by the first workload exceeding a second threshold usage.

9. The system of claim 1, wherein the threshold usage is a user-supplied value indicated in metadata associated with the first workload.

10. The system of claim 1, wherein the scheduler is further configured to:
    monitor respective resource usage by one or more instances of the first workload deployed in the system, wherein the deployment of the first workload on the node is a deployment of an instance of the first workload in the system; and
    determine the threshold usage for the first workload based on the monitored respective resource usage by the one or more instances.

11. The system of claim 1, wherein the scheduler is a cluster scheduler and the node is a cluster node.

12. The system of claim 1, wherein the resources of the node include one or more of processor resources, memory resources, or bandwidth resources.

13. A method comprising:
    deploying a first workload for execution on a node;
    determining that the first workload is running in a transient state in response to determining that resource usage by the first workload exceeds a threshold usage;
    reserving a first amount of resources of the node for the first workload based on the determination that the first workload is in the transient state;

determining that the first workload is running in a non-transient state in response to determining that the resource usage by the first workload is less than the threshold usage;

reducing the first amount of the resources reserved for the first workload based on the determination that the first workload is in the non-transient state;

determining whether an unreserved amount of the resources of the node is sufficient for deployment of a second workload on the node, wherein reducing the first amount of the resources reserved for the first workload increases the unreserved amount of the resources;

based on the unreserved amount of the resources being sufficient for the deployment of the second workload, dispatching the second workload to be deployed on the node; and reserving a second amount of the resources of the node for the second workload based on the second workload being deployed on the node.

14. The method of claim 13, wherein reducing the first amount of the resources includes setting the first amount of the resources to correspond to a user-supplied amount indicated in metadata associated with the first workload.

15. The method of claim 13, further comprising:

determining that the first workload is running in the transient state based on passage of less than a threshold initialization period from a start of the deployment of the first workload on the node; and determining that the first workload is running in the non-transient state based on passage of the threshold initialization period from the start of the deployment of the first workload on the node.

16. A non-transitory machine-readable medium storing instructions that, when executed by at least one processor of a computer system, cause the computer system to:

deploy a first workload for execution on a node;

determine that the first workload is running in a transient state in response to determining that resource usage by the first workload exceeds a threshold usage;

reserve a first amount of resources of the node for the first workload based on the determination that the first workload is in the transient state;

determine that the first workload is running in a non-transient state in response to determining that the resource usage by the first workload is less than the threshold usage;

reduce the first amount of the resources reserved for the first workload based on the determination that the first workload is in the non-transient state;

determine whether an unreserved amount of the resources of the node is sufficient for deployment of a second workload on the node, wherein reducing the first amount of the resources reserved for the first workload increases the unreserved amount of the resources;

based on the unreserved amount of the resources being sufficient for the deployment of the second workload, dispatch the second workload to be deployed on the node; and reserve a second amount of the resources of the node for the second workload based on the second workload being deployed on the node.

\* \* \* \* \*